United States Patent
Chan et al.

(10) Patent No.: US 11,200,681 B2
(45) Date of Patent: Dec. 14, 2021

(54) MOTION DETECTION METHOD AND MOTION DETECTION SYSTEM WITH LOW COMPUTATIONAL COMPLEXITY AND HIGH DETECTION ACCURACY

(71) Applicant: Realtek Semiconductor Corp., HsinChu (TW)

(72) Inventors: Shang-Lun Chan, Hsinchu (TW); Chao-Hsun Yang, New Taipei (TW); Chun-Chang Wu, Taichung (TW); Shih-Tse Chen, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/744,208

(22) Filed: Jan. 16, 2020

(65) Prior Publication Data
US 2021/0074001 A1 Mar. 11, 2021

(30) Foreign Application Priority Data
Sep. 6, 2019 (TW) .................................. 108132236

(51) Int. Cl.
*G06T 7/215* (2017.01)
*G06T 7/194* (2017.01)
(Continued)

(52) U.S. Cl.
CPC .............. *G06T 7/215* (2017.01); *G06T 3/40* (2013.01); *G06T 5/30* (2013.01); *G06T 7/194* (2017.01);
(Continued)

(58) Field of Classification Search
CPC ... G06T 7/194; G06T 7/215; G06T 7/20–292; G06T 2207/20084;
(Continued)

(56) References Cited

U.S. PATENT DOCUMENTS

| | | | |
|---|---|---|---|
| 8,891,009 B2 * | 11/2014 | Lu ....................... | G06K 9/00751 348/441 |
| 2005/0105765 A1 * | 5/2005 | Han .................. | G08B 13/19615 382/100 |
| 2009/0208062 A1 * | 8/2009 | Sorek .................. | H04N 5/23229 382/107 |
| 2010/0208063 A1 * | 8/2010 | Lee ..................... | G06K 9/00771 348/143 |

(Continued)

FOREIGN PATENT DOCUMENTS

TW 200703154 1/2007

OTHER PUBLICATIONS

Kim, Chulyeon, et al. "A hybrid framework combining background subtraction and deep neural networks for rapid person detection." Journal of Big Data 5.1 (2018): 1-24. (Year: 2018).*

(Continued)

*Primary Examiner* — Shefali D Goradia
(74) *Attorney, Agent, or Firm* — Winston Hsu

(57) ABSTRACT

A motion detection method includes acquiring a raw image, detecting a motion object image according to the raw image by using a motion detector, cropping the raw image to generate a sub-image according to the motion object image, and inputting the sub-image to a processor for determining if a motion object of the sub-image matches with a detection category. The processor includes a neural network. The shape of the sub-image is a polygonal shape.

20 Claims, 6 Drawing Sheets

(51) Int. Cl.
*G06T 5/30* (2006.01)
*G06T 7/70* (2017.01)
*G06T 7/60* (2017.01)
*G06T 3/40* (2006.01)

(52) U.S. Cl.
CPC .............. *G06T 7/60* (2013.01); *G06T 7/70* (2017.01); *G06T 2207/20021* (2013.01); *G06T 2207/20081* (2013.01); *G06T 2207/20084* (2013.01); *G06T 2207/20132* (2013.01); *G06T 2207/30196* (2013.01)

(58) Field of Classification Search
CPC ... G06T 2207/20081; G06T 5/30; G06T 7/70; G06T 7/60; G06T 3/40; G06T 2207/20132; G06T 2207/30196; G06T 2207/20021; G06N 3/02–088
USPC .......................................... 382/156–158, 103
See application file for complete search history.

(56) References Cited

U.S. PATENT DOCUMENTS

| | | | |
|---|---|---|---|
| 2010/0208084 A1* | 8/2010 | Pinto | H04N 5/23248 348/207.1 |
| 2016/0171311 A1* | 6/2016 | Case | G06K 9/00771 382/103 |
| 2019/0034734 A1* | 1/2019 | Yen | G06T 7/246 |
| 2020/0005613 A1* | 1/2020 | Yuan | G08B 13/19613 |
| 2020/0082544 A1* | 3/2020 | Zhu | G06K 9/00711 |
| 2021/0019893 A1* | 1/2021 | Ananthanarayanan | G06T 7/194 |
| 2021/0049770 A1* | 2/2021 | Ford | G06K 9/00744 |

OTHER PUBLICATIONS

Szeliski, Richard. Computer vision : algorithms and applications. London New York: Springer, 2011. Print. (Year: 2011).*

* cited by examiner

MOTION DETECTION METHOD AND MOTION DETECTION SYSTEM WITH LOW COMPUTATIONAL COMPLEXITY AND HIGH DETECTION ACCURACY

BACKGROUND OF THE INVENTION

1. Field of the Invention

The present disclosure illustrates a motion detection method and a motion detection system, and more particularly, a motion detection method and a motion detection system having low computational complexity and providing high detection accuracy.

2. Description of the Prior Art

With rapid developments of technologies, consumer electronic products can provide functions of processing at least one video stream and processing intelligent video analytics. The intelligent video analytics (IVA) can be applied to a security control system. When a process of the IVA is applied to the security control system, a humanoid detection technology is an important and indispensable technology. The video stream can be inputted to a processor for determining if a human is present during at least one frame period.

However, since requirements of a resolution and a transmission bandwidth of the video stream are increased in recent years, it is hard to perform a humanoid detection with high detection accuracy in real-time. In general, when a humanoid detection system is required to provide the high detection accuracy and provide an instant detection result (i.e., a very short processing time is required), high computational complexity and improved image processing algorithms are required in the humanoid detection system for efficiently processing floating-point numbers. However, increasing the computational complexity of the humanoid detection system or improving the image processing algorithms for efficiently processing the floating-point numbers may require additional hardware design costs and/or software testing costs. Therefore, to develop a humanoid detection method with high detection accuracy for any programmable system with a low computing capability or an embedded system is an important issue of the IVA.

SUMMARY OF THE INVENTION

In an embodiment of the present disclosure, a motion detection method is disclosed. The motion detection method comprises acquiring a raw image, detecting a motion object image according to the raw image by using a motion detector, cropping the raw image to generate a sub-image according to the motion object image, and inputting the sub-image to a processor for determining if a motion object of the sub-image matches with a detection category. The processor comprises a neural network. The shape of the sub-image is a polygonal shape.

In another embodiment of the present disclosure, a motion detection system is disclosed. The motion detection system comprises an image capturing device, a motion detector, a memory, and a processor. The image capturing device is configured to acquire a raw image. The motion detector is coupled to the image capturing device. The memory is configured to save image data. The processor is coupled to the motion detector and the memory. After the image capturing device acquires the raw image, the motion detector detects a motion object image according to the raw image. The processor crops the raw image to generate a sub-image according to the motion object image and transmits the sub-image to the memory. The processor determines if a motion object of the sub-image matches with a detection category. The processor comprises a neural network. A shape of the sub-image is a polygonal shape.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
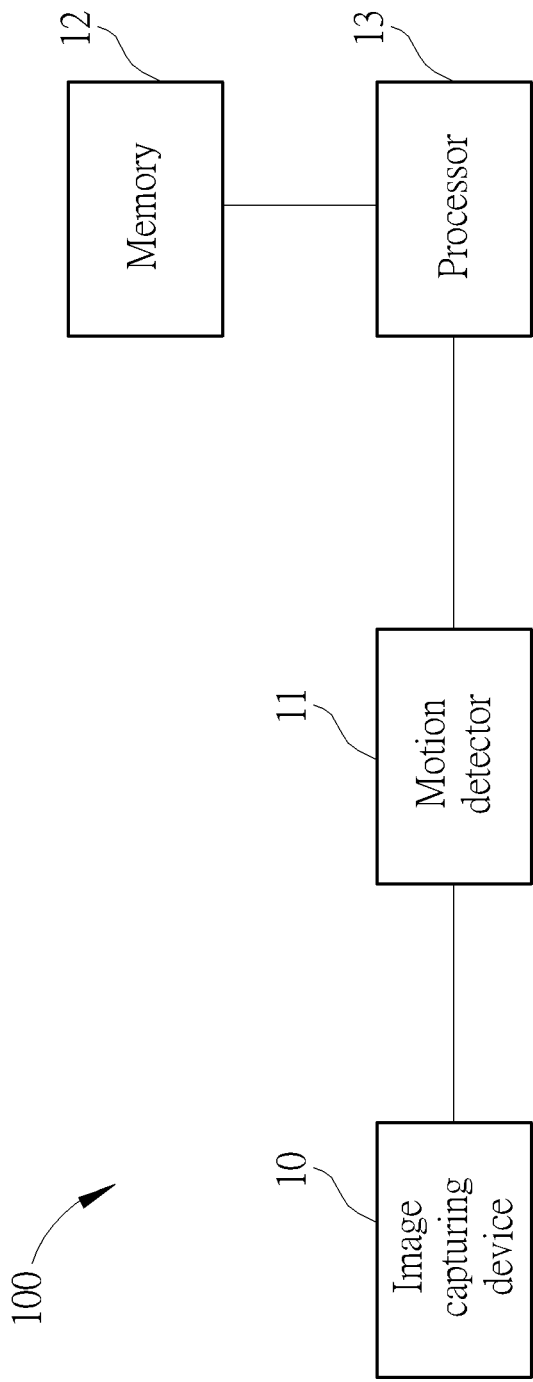
FIG. 1 is a block diagram of a motion detection system according to an embodiment of the present disclosure.

FIG. 1 is a block diagram of a motion detection system 100 according to an embodiment of the present disclosure. The motion detection system 100 includes an image capturing device 10, a motion detector 11, a memory 12, and a processor 13. The image capturing device 10 is used for acquiring a raw image. The image capturing device 10 can be any device having a photosensitive function, such as a camera or a video recorder. The motion detector 11 is coupled to the image capturing device 10. The motion detector 11 can detect the motion object image according to the raw image by using a frame difference process. The frame difference process can collect two or more continuous image frames for checking if coordinates of image objects are shifted among these continuous image frames. Therefore, the frame difference process can detect a presence of the motion object image. The motion detector 11 can detect the motion object image according to the raw image by using a background modeling process. The background modeling process can use a plurality of image frames for generating background model images including fixed objects. Then, the background modeling process can detect color tone differences of the background model images for determining a presence and a range of the motion object image. However, the motion detector 11 is not limited to a specific technology for detecting the motion object. The memory 12 is configured to save image data. The memory 12 can be a hard disk, a random access memory, a flash memory, or any data buffering device. The processor 13 is coupled to the motion detector 11 and the memory 12.

In the motion detection system 100, after the image capturing device 10 acquires the raw image, the motion detector 11 can detect the motion object image according to the raw image. Then, the processor 13 can crop the raw image to generate the sub-image according to the motion object image and can transmit the sub-image to the memory 12. Further, the processor 13 can determine if a motion object of the sub-image matches with a detection category. In the motion detection system 100, the processor 13 can include a neural network. For example, the processor 13 can include a convolutional neural networks (CNN) based humanoid detector. A shape of the sub-image cropped from the raw image can be a polygonal shape. Therefore, the motion detection system 100 can be regarded as an input-output (I/O) system. The motion detection system 100 can receive the raw image, analyze the raw image, and determine if the motion object image is present. Finally, the motion detection system 100 can output a detection result. Details of a motion detection method performed by the motion detection system 100 are illustrated below.

Figure 2:
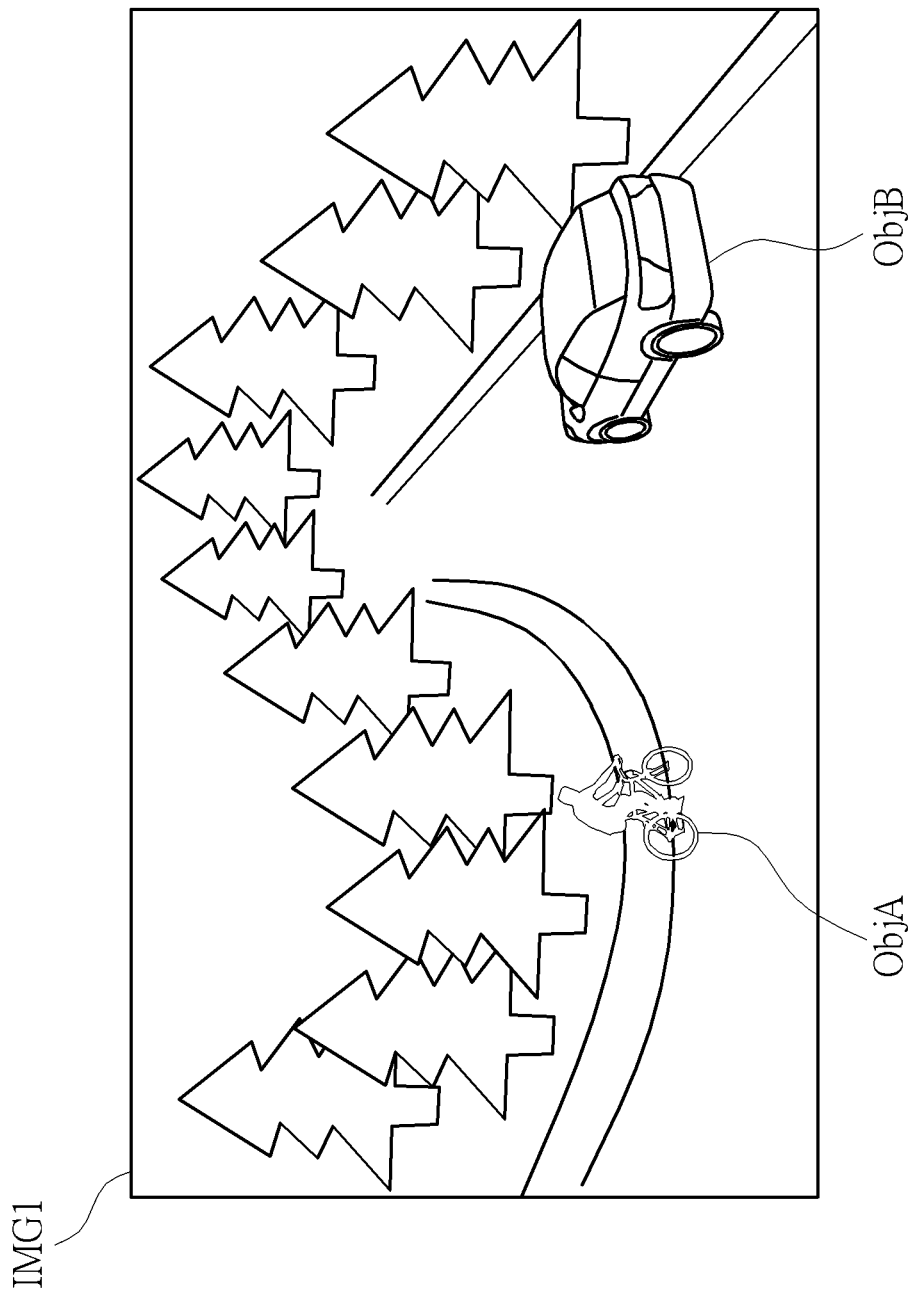
FIG. 2 is an illustration of acquiring a raw image by using an image capturing device of the motion detection system in FIG. 1.

FIG. 2 is an illustration of acquiring the raw image IMG1 by using the image capturing device 10 of the motion detection system 100. Here, the image capturing device 10 (i.e., a camera) can acquire the raw image IMG1 of a street view. The raw image IMG1 can include a motion object ObjA and a non-motion object ObjB. In FIG. 2, the motion object ObjA of the raw image IMG1 includes a bicycle and a bicyclist. The non-motion object ObjB can be a parked vehicle or a tree.

Figure 3:
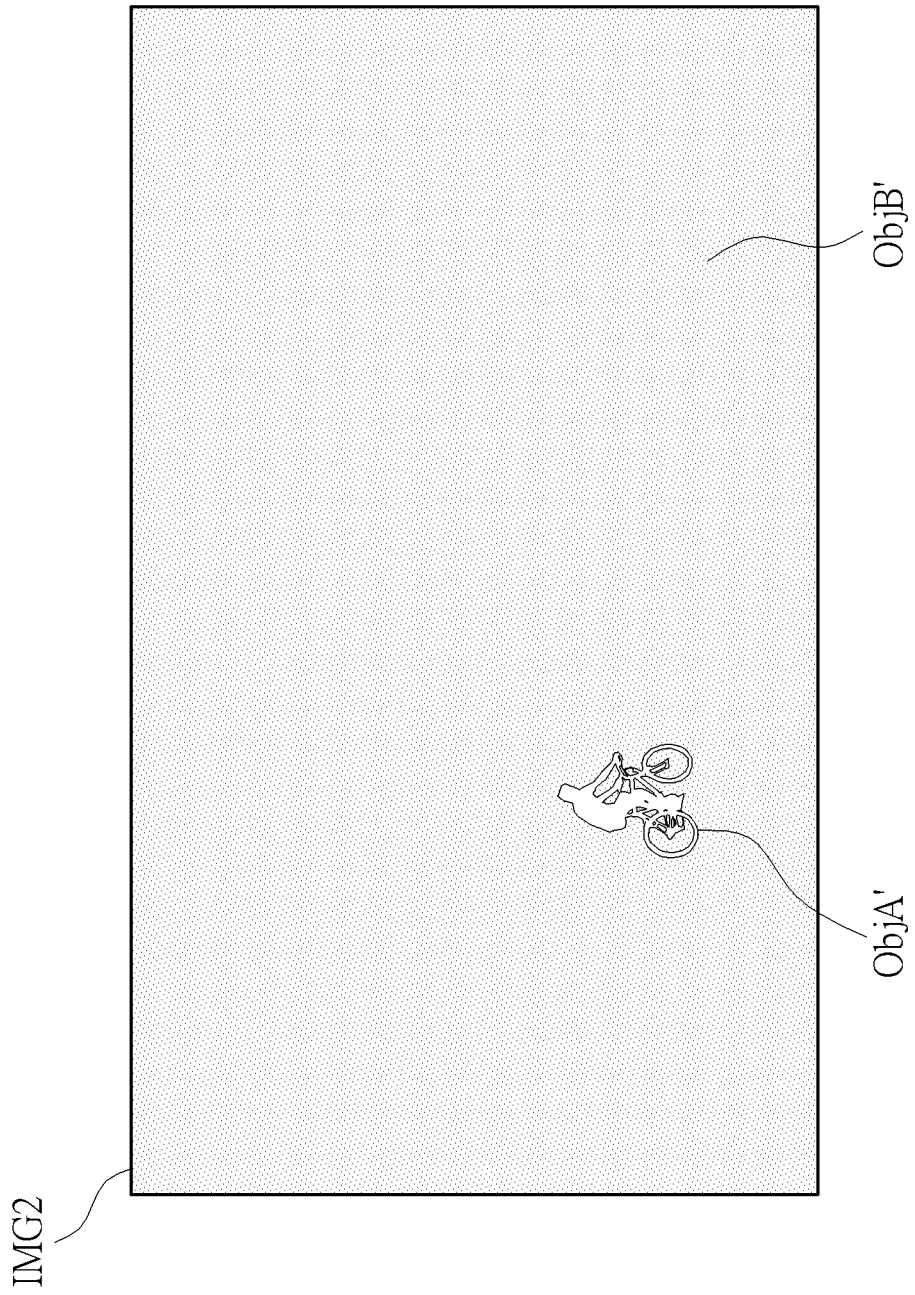
FIG. 3 is an illustration of detecting a motion object from the raw image to generate a motion detection image by using a motion detector of the motion detection system in FIG. 1.

FIG. 3 is an illustration of detecting the motion object ObjA from the raw image IMG1 to generate a motion detection image IMG2 by using the motion detector 11 of the motion detection system 100. As previously mentioned, the motion detector 11 can detect the motion object image according to the raw IMG1 image by using the background modeling process or the frame difference process. Details are illustrated below. First, a user can use the processor 13 for setting the detection category of the motion detection system 100. For example, the detection category of the motion detection system 100 can be set as a humanoid detection. Then, the image capturing device 10 can input the raw image IMG1 to the motion detector 11. Then, the motion detector 11 can partition the raw image IMG1 into the motion object image and a background image. The motion object image belongs to a foreground image of the raw image IMG1. In practice, the processor 13 can apply dual gray levels to the raw image IMG1 for generating the motion detection image IMG2. For example, in FIG. 3, the motion detection image IMG2 can include the motion object ObjA (i.e., for avoiding ambiguity, the motion object ObjA is called as a motion object ObjA' in FIG. 3 hereafter). The motion object ObjA' (i.e., the bicycle and the bicyclist) has a first gray level, such as a white color. Further, the background image of the motion detection image IMG2 can include the non-motion object ObjB (i.e., for avoiding ambiguity, the non-motion object ObjB is called as a non-motion object ObjB' in FIG. 3 hereafter). The non-motion object ObjB' has a second gray level, such as a black color. In FIG. 3, since the background image of the motion detection image IMG2 and the non-motion object ObjB' have the same gray level (black), color details of the background image and the non-motion object ObjB' can be masked. However, the motion detector 11 is not limited to using the dual gray levels for generating the motion detection image IMG2 by partitioning the raw image IMG1 into the foreground image and the background image. Any reasonable technology of distinguishing the motion object ObjA' and the non-motion object ObjB' falls into the scope of the present disclosure.

Figure 4:
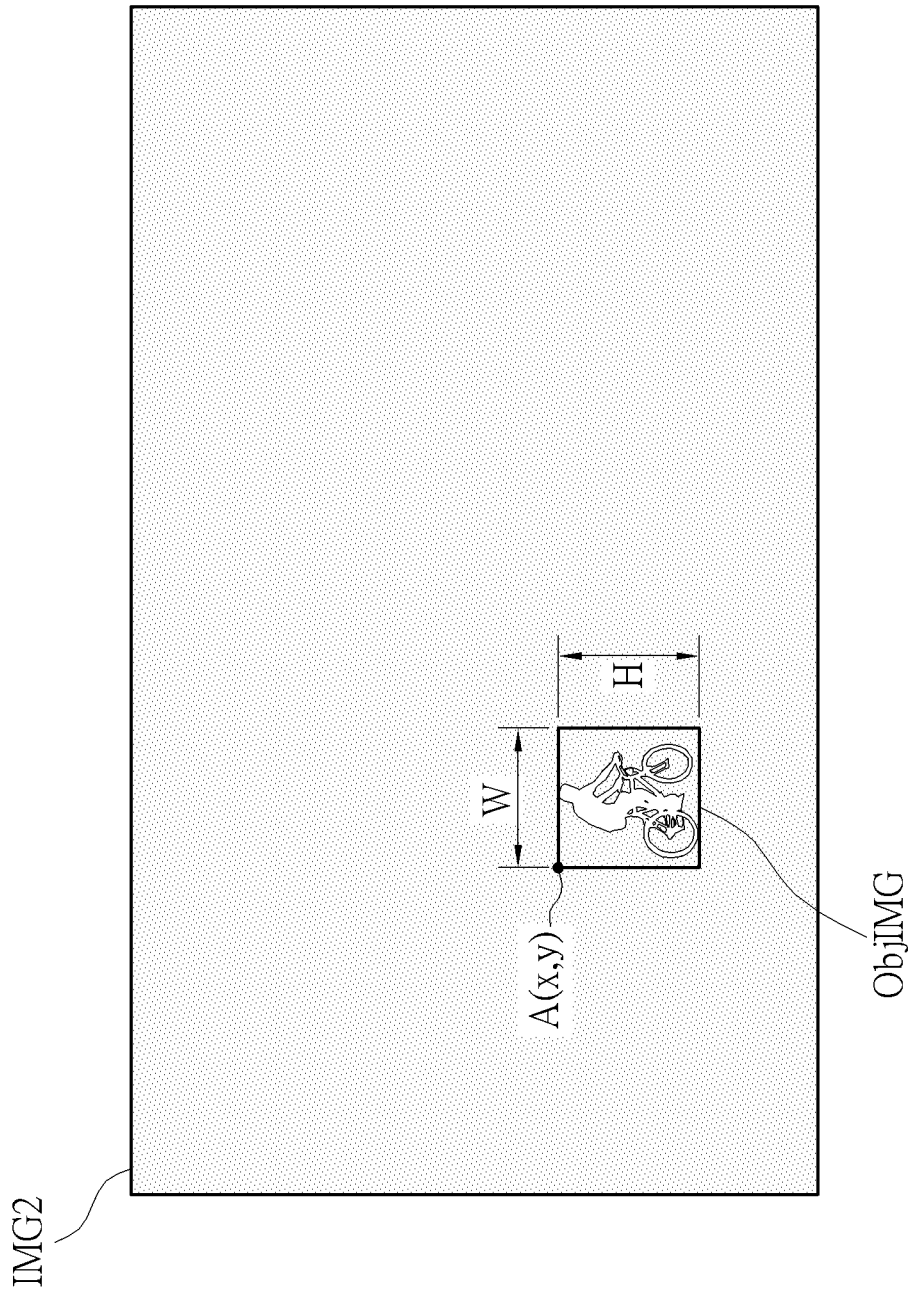
FIG. 4 is an illustration of generating a motion object image in the motion detection system in FIG. 1.

FIG. 4 is an illustration of generating the motion object image ObjIMG in the motion detection system 100. As previously mentioned, the motion detector 11 can use the dual gray levels for generating the motion detection image IMG2 by partitioning the raw image IMG1 into the foreground image and the background image. Therefore, the motion detection image IMG2 having the black color and the white color is illustrated in FIG. 4. After the motion detector 11 detects the motion object ObjA' in FIG. 3, the motion object image ObjIMG (i.e., a rectangular image) can be generated according to contours of the motion object ObjA'. In other words, boundaries of the motion object image ObjIMG can be determined according to the contours of the motion object ObjA'. If the motion object ObjA' has a large size, a range of the motion object image ObjIMG determined by the motion detector 11 would be large. If the motion object ObjA' has a small size, a range of the motion object image ObjIMG determined by the motion detector 11 would be small. Further, after the motion object image ObjIMG is generated by the motion detector 11, the processor 13 can adjust an aspect ratio of the motion object image ObjIMG (i.e., resizing the motion object image ObjIMG). Here, resizing the motion object image ObjIMG appropriately can optimize a processing time and computational complexity of the motion detection system 100. Further, the processor 13 can perform at least one image processing operation to process a plurality of pixels of the motion object image ObjIMG for generating complete and continuous image pixel information. For example, the processor 13 can perform an erosion processing operation, a dilation processing operation, and/or a connected component processing operation to process a plurality of pixels corresponding to the motion object ObjA' of the motion object image ObjIMG. Further, in order to improve detection efficiency, an image filtering process can be introduced to the motion detection system 100 for assisting to detect the motion object ObjA'. For example, the processor 13 can perform the image filtering process for filtering out at least one motion object image from the raw image IMG1 according to the aspect ratio and/or a default resolution of the motion object image ObjIMG when the at least one motion object image and the detection category are mismatched. For example, the user can set the motion detection system 100 to perform the humanoid detection through the processor 13. A normal height of a human body is about 1-2 meters. A normal length of an arm span of the human is about 1-2 meters. Therefore, although a small animal (i.e., such as a small puppy with a length smaller than 1 meter) is detected as a motion object, an image of the small animal can be filtered out from the raw image IMG1. By using the image filtering process, the computational complexity of subsequent image processing operations of the motion detection system 100 can be reduced. Therefore, the detection efficiency can be improved.

As previously mentioned, the motion detection system 100 can use the memory 12 for saving the image data. The image data can be digital image data. For example, a range and a position of the motion object image ObjIMG can be digitized as the image data, as illustrated below. In FIG. 4, the processor 13 can acquire two-dimensional coordinates of a vertex of a rectangular range of the motion object image ObjIMG, such as coordinates A(x, y) of an upper-left vertex A. Further, the processor 13 can acquire a width W of the rectangular range and a height H of the rectangular range of the motion object image ObjIMG. In other words, a position and the rectangular range of the object image ObjIMG can be digitized as the image data including the coordinates A (x, y) of the vertex A, the width W, and the height H. Such digitized image data can be saved in the memory 12.

Figure 5:
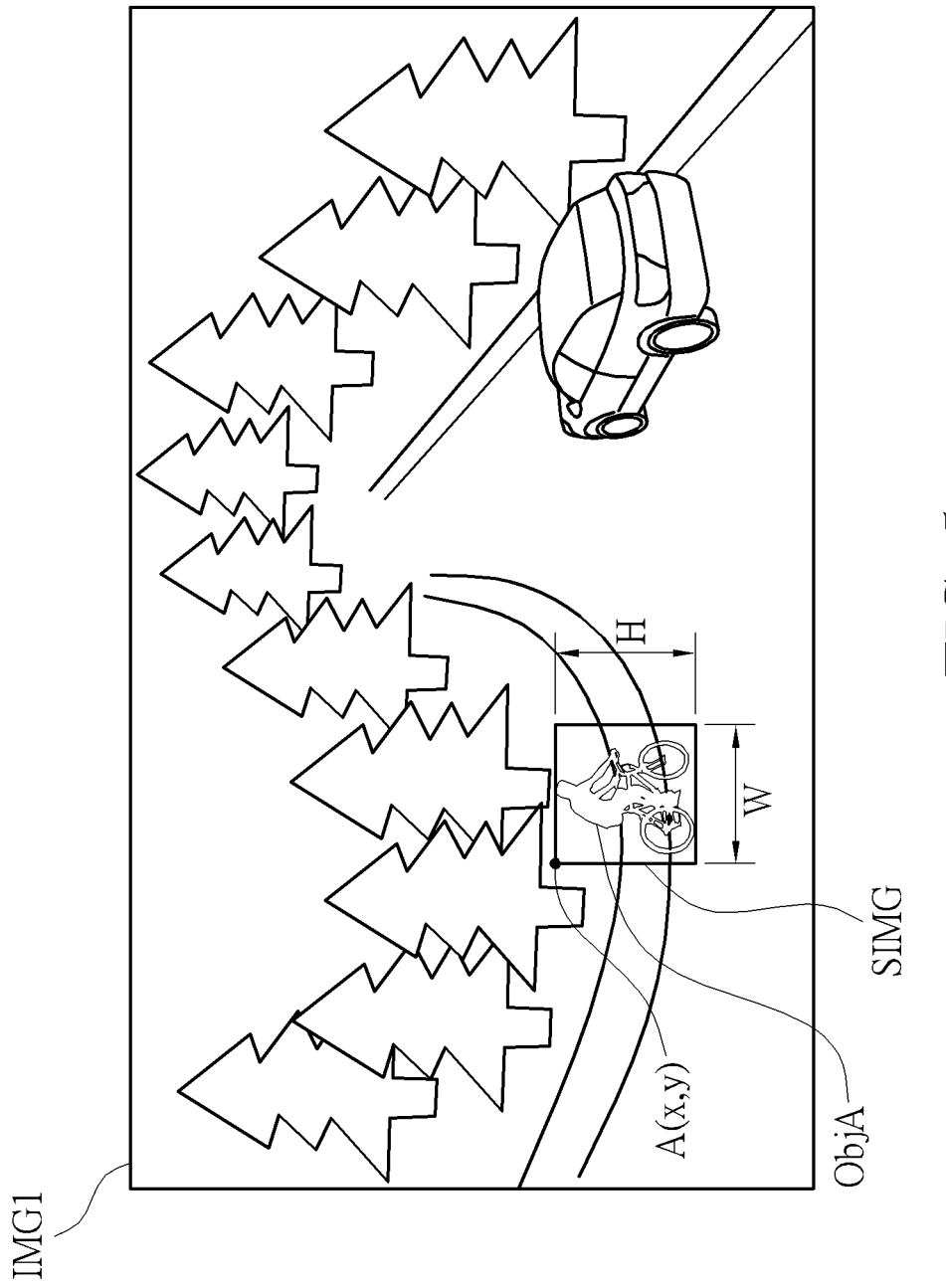
FIG. 5 is an illustration of cropping the raw image to generate a sub-image corresponding to the motion object image in the motion detection system in FIG. 1.

FIG. 5 is an illustration of cropping the raw image IMG1 to generate a sub-image SIMG corresponding to the motion object image ObjIMG in the motion detection system 100. As previously mentioned, the position and the rectangular range of the object image ObjIMG can be digitized as the image data including the coordinates A(x, y) of the vertex A, the width W, and the height H. Therefore, after the processor 13 acquires the coordinates A(x, y) of the vertex A, the width W, and the height H from the memory 12, the processor 13 can crop the raw image IMG1 to generate the sub-image SIMG accordingly. Here, an aspect ratio of the sub-image SIMG and the aspect ratio of the motion object image ObjIMG can be identical. For example, when the motion object image ObjIMG is a rectangular image having the aspect ratio equal to W/H, the sub-image SIMG cropped from the raw image IMG1 can be a rectangular image having the aspect ratio equal to W/H. Further, positions of the object image ObjIMG and the sub-image SIMG can be identical. Similarly, the processor 13 can adjust a size and/or a resolution of the sub-image SIMG for optimizing the processing time and the computational complexity of the motion detection system 100.

As previously mentioned, the user can use the processor 13 for setting the detection category of the motion detection system 100. After the detection category is set by the processor 13, the neural network of the processor 13 can be trained according to the detection category. Further, after the neural network is trained, the processor 13 has a capability of determining if the motion object of the sub-image SIMG matches with the detection category. In other words, after information of the sub-image SIMG is received by the processor 13, the processor 13 can use the "trained" neural network for analyzing the sub-image SIMG in order to determine if the motion object of the sub-image SIMG matches with the detection category. For example, in FIG. 5, the user can set the detection category of the motion detection system 100 as a humanoid detection. The sub-image SIMG includes the motion object ObjA. The motion object ObjA of the raw image IMG1 includes the bicycle and the bicyclist. Therefore, after the humanoid detection is performed by the motion detection system 100, the motion detection system 100 can be regarded as an input-output (I/O) system capable of performing the humanoid detection. In the motion detection system 100, the raw image IMG1 can be regarded as the input data. The output data can be a detection result for informing the user if a person is present.

Figure 6:
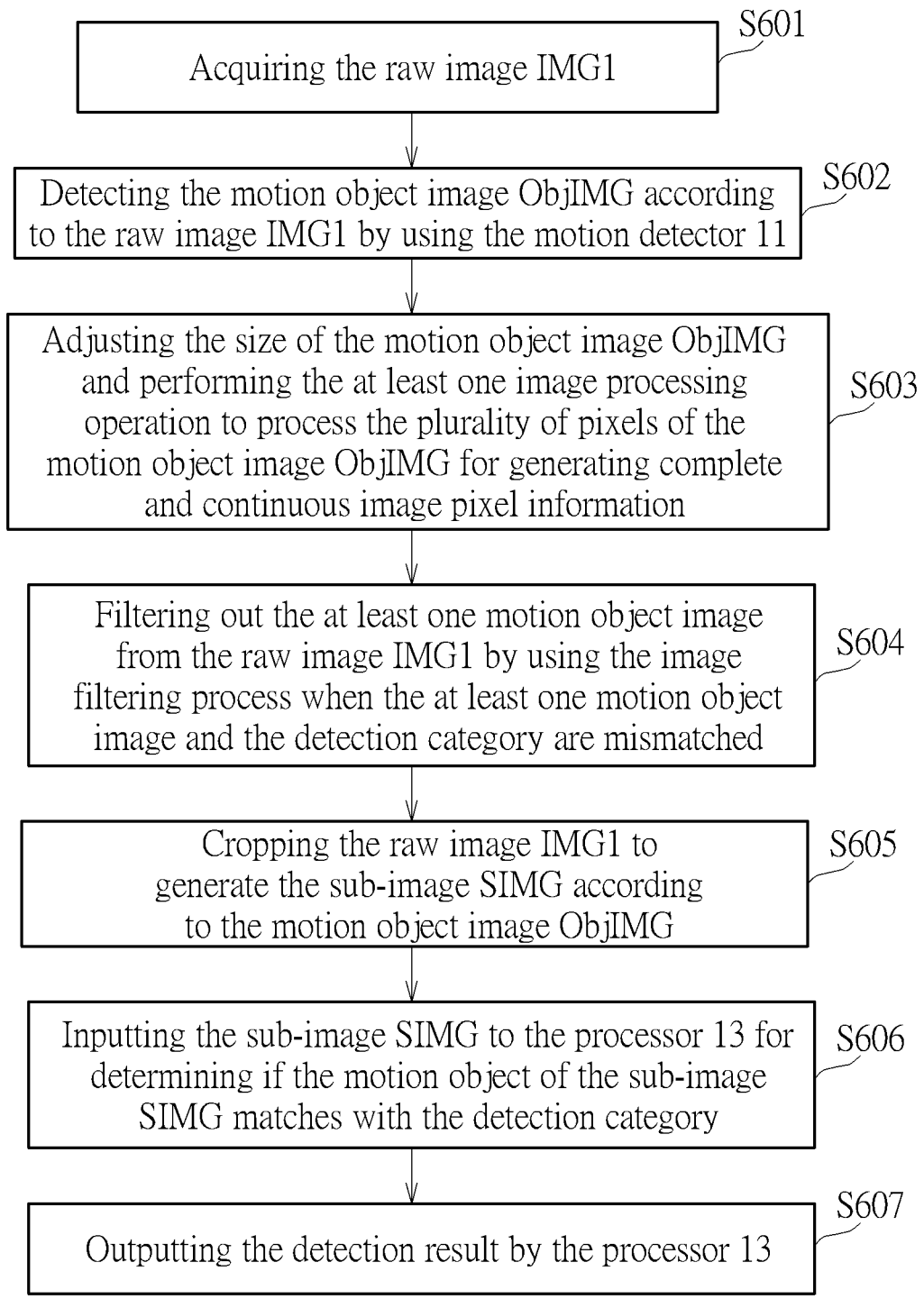
FIG. 6 is a flow chart of a motion detection method performed by the motion detection system in FIG. 1.

FIG. 6 is a flow chart of a motion detection method performed by the motion detection system 100. The motion detection method includes step S601 to step S607. Any reasonable technology modification falls into the scope of the present invention. Step S601 to step S607 are illustrate below.

step S601: acquiring the raw image IMG1;
step S602: detecting the motion object image ObjIMG according to the raw image IMG1 by using the motion detector 11;
step S603: adjusting the size of the motion object image ObjIMG and performing the at least one image processing operation to process the plurality of pixels of the motion object image ObjIMG for generating complete and continuous image pixel information;
step S604: filtering out the at least one motion object image from the raw image IMG1 by using the image filtering process when the at least one motion object image and the detection category are mismatched;
step S605: cropping the raw image IMG1 to generate the sub-image SIMG according to the motion object image ObjIMG;
step S606: inputting the sub-image SIMG to the processor 13 for determining if the motion object of the sub-image SIMG matches with the detection category;
step S607: outputting the detection result by the processor 13.

Details of step S601 to step S607 are previously illustrated. Thus, they are omitted here. Further, the motion detection method of the motion detection system 100 is not limited to step S601 to step S607. For example, step S603 to step S604 can be omitted for reducing computational complexity. Moreover execution orders of step S603 and step S604 can be interchanged. The motion detection system 100 can also detect all motion object images simultaneously. Any reasonable technology modification falls into the scope of the present invention. By using step S601 to step S607, the computational complexity of the motion detection system 100 can be reduced. Therefore, when the motion detection system 100 is applied to the humanoid detection, the motion detection system 100 can provide a real-time humanoid detection result and high humanoid detection reliability.

A principle of performing the motion detection method by the motion detection system 100 with low computational complexity is illustrated below. In the motion detection system 100, the motion detector 11 can be coupled to a front end of the neural network-based humanoid detector (the processor 13). Therefore, the processor 13 can identify the motion object without analyzing a full-resolution raw image. In other words, the processor 13 can analyze the sub-image including the motion object detected by the motion detector 11. Since an amount of pixels of the sub-image including the motion object is much smaller than the full-resolution raw image, the computational complexity of each subsequent image processing mechanism of the motion detection system 100 can be greatly reduced.

To sum up, the present disclosure illustrates a motion detection method and a motion detection system. Since the motion detection system has a low computational complexity, it can be implemented with any programmable hardware with a low computing capability. In the motion detection system, since a motion detector can be introduced for detecting a sub-image including a motion object from the raw image, the motion detection system only analyzes the sub-image detected by the motion detector for determining if the motion object of a detection category is present. Therefore, instead of analyzing a full-resolution raw image by the conventional motion detection system, the motion detection system of the present disclosure can reduce the computational complexity, thereby providing a real-time and accurate motion detection result.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A motion detection method comprising:
acquiring a raw image;
detecting a motion object image according to the raw image;
acquiring processing time of a motion detection process;
acquiring computational complexity of the motion detection process;

updating the motion object image by adjusting an aspect ratio of the motion object image after the motion object image is detected according to the processing time and the computational complexity;

cropping the raw image to generate a sub-image according to the motion object image; and inputting the sub-image to a processor for determining if a motion object of the sub-image matches with a detection category;

wherein the processor comprises a neural network, and a shape of the sub-image is a polygonal shape.

2. The method of claim 1, further comprising:

performing at least one image processing operation to process a plurality of pixels of the motion object image for generating complete and continuous image pixel information;

wherein an aspect ratio of the sub-image and the aspect ratio of the motion object image are identical, and the at least one image processing operation comprises an erosion processing operation, a dilation processing operation, and/or a connected component processing operation.

3. The method of claim 1, further comprising:

inputting the raw image; and partitioning the raw image into the motion object image and a background image;

wherein the motion object image belongs to a foreground image of the raw image.

4. The method of claim 3, wherein the foreground image has a first gray level, the background image has a second gray level, and the first gray level and the second gray level are different.

5. The method of claim 1, further comprising:

filtering out at least one motion object image from the raw image by using an image filtering process when the at least one motion object image and the detection category are mismatched;

wherein the image filtering process is performed by the processor according to an aspect ratio and/or a default resolution of the motion object image.

6. The method of claim 1, wherein the shape of the sub-image is a rectangular shape.

7. The method of claim 1, further comprising:

acquiring two-dimensional coordinates of a vertex of a rectangular range of the motion object image;

acquiring a width of the rectangular range and a height of the rectangular range of the motion object image; and determining a range of the sub-image cropped from the raw image according to the two-dimensional coordinates of the vertex, the width of the rectangular range, and the height of the rectangular range.

8. The method of claim 1, further comprising:

setting the detection category by the processor; and training the neural network of the processor according to the detection category;

wherein after the neural network is trained, the processor has a capability of determining if the motion object of the sub-image matches with the detection category.

9. The method of claim 1, wherein detecting the motion object image according to the raw image, is detecting the motion object image according to the raw image under a frame difference process or a background modeling process.

10. The method of claim 1, wherein the detection category is a humanoid detection, and the processor is a neural network-based humanoid detector.

11. A motion detection system comprising:

an image capturing device configured to acquire a raw image;

a memory configured to save image data; and a processor coupled to the memory;

wherein after the image capturing device acquires the raw image, a motion object image is detected according to the raw image, the processor acquires processing time and computational complexity of a motion detection process, the processor updates the motion object image by adjusting an aspect ratio of the motion object image after the motion object image is detected according to the processing time and the computational complexity, the processor crops the raw image to generate a sub-image according to the motion object image and transmits the sub-image to the memory, the processor determines if a motion object of the sub-image matches with a detection category, the processor comprises a neural network, and a shape of the sub-image is a polygonal shape.

12. The system of claim 11, wherein the processor performs at least one image processing operation to process a plurality of pixels of the motion object image for generating complete and continuous image pixel information, an aspect ratio of the sub-image and the aspect ratio of the motion object image are identical, and the at least one image processing operation comprises an erosion processing operation, a dilation processing operation, and/or a connected component processing operation.

13. The system of claim 11, wherein the image capturing device inputs the raw image, the raw image is partitioned into the motion object image and a background image, and the motion object image belongs to a foreground image of the raw image.

14. The system of claim 13, wherein the foreground image has a first gray level, the background image has a second gray level, and the first gray level and the second gray level are different.

15. The system of claim 11, wherein the processor performs an image filtering process for filtering out at least one motion object image from the raw image according to an aspect ratio and/or a default resolution of the motion object image when the at least one motion object image and the detection category are mismatched.

16. The system of claim 11, wherein the shape of the sub-image is a rectangular shape.

17. The system of claim 11, wherein the processor acquires two-dimensional coordinates of a vertex of a rectangular range of the motion object image, acquires a width of the rectangular range and a height of the rectangular range of the motion object image, and determines a range of the sub-image cropped from the raw image according to the two-dimensional coordinates of the vertex, the width of the rectangular range, and the height of the rectangular range.

18. The system of claim 11, wherein after the detection category is set by the processor, the neural network of the processor is trained according to the detection category, and after the neural network is trained, the processor has a capability of determining if the motion object of the sub-image matches with the detection category.

19. The system of claim 11, wherein the motion object image is detected according to the raw image under a frame difference process or a background modeling process.

20. The system of claim 11, wherein the detection category is a humanoid detection, and the processor is a neural network-based humanoid detector.

* * * * *